US012687660B2

(12) United States Patent
Ovrutsky et al.

(10) Patent No.: US 12,687,660 B2
(45) Date of Patent: Jul. 21, 2026

(54) SUPERHYDROPHOBIC SURFACE IN THERMAL INFRARED IMAGING DEVICE

(71) Applicant: Teledyne FLIR Commercial Systems, Inc., Goleta, CA (US)

(72) Inventors: David Ovrutsky, Charlotte, NC (US); Theodore R. Hoelter, Santa Barbara, CA (US)

(73) Assignee: Teledyne FLIR Commercial Systems, Inc., Goleta, CA (US)

( * ) Notice: Subject to any disclaimer, the term of this patent is extended or adjusted under 35 U.S.C. 154(b) by 689 days.

(21) Appl. No.: 17/885,450

(22) Filed: Aug. 10, 2022

(65) Prior Publication Data

US 2023/0051264 A1 Feb. 16, 2023

Related U.S. Application Data

(60) Provisional application No. 63/232,591, filed on Aug. 12, 2021.

(51) Int. Cl.
    *G02B 1/18* (2015.01)
    *C01B 32/26* (2017.01)
    (Continued)

(52) U.S. Cl.
    CPC ............... *G02B 1/18* (2015.01); *G02B 1/118* (2013.01); *G02B 1/14* (2015.01); *G02B 27/0006* (2013.01);
    (Continued)

(58) Field of Classification Search
    None
    See application file for complete search history.

(56) References Cited

U.S. PATENT DOCUMENTS

| | | | |
|---|---|---|---|
| 11,740,399 B2 * | 8/2023 | Uyeno | G02B 5/0205 |
| | | | 359/599 |
| 2010/0033819 A1 * | 2/2010 | Schulz | G02B 1/118 |
| | | | 359/507 |

(Continued)

FOREIGN PATENT DOCUMENTS

| | | | | |
|---|---|---|---|---|
| CN | 111560592 A | * | 8/2020 | G02B 1/14 |

OTHER PUBLICATIONS

Baldacchini, Tommaso et al.; "Superhydrophobic Surfaces Prepared for Microstructuing of Silicon Using a Femtosecond Laser," Langmuir. May 23, 2006;22(11):4917-9. doi: 10.1021/la053374k. PMID: 16700574.

(Continued)

*Primary Examiner* — Derek S. Chapel
(74) *Attorney, Agent, or Firm* — Haynes and Boone, LLP

(57) ABSTRACT

Various techniques are provided for preventing excessive accumulation of moisture onto a surface of an optical component of an imaging device. In one example, a method includes providing a bulk layer of an optical component of a thermal imaging system, wherein the bulk layer is configured to pass thermal radiation. The method further includes depositing a diamond like coating (DLC) to provide an external surface of the optical component, wherein the DLC exhibits a resistance to abrasion. The method further includes forming a plurality of nanostructures in the optical component, wherein the nanostructures exhibit a superhydrophobic property to prevent excessive moisture accumulation on the external surface of the optical component. Additional methods and systems are also provided.

20 Claims, 6 Drawing Sheets

(51) Int. Cl.

| | | |
|---|---|---|
| *G02B 1/118* | (2015.01) | |
| *G02B 1/14* | (2015.01) | |
| *G02B 27/00* | (2006.01) | |
| *H04N 23/51* | (2023.01) | |
| *H04N 23/52* | (2023.01) | |

(52) U.S. Cl.
CPC ............ *H04N 23/51* (2023.01); *H04N 23/52* (2023.01); *C01B 32/26* (2017.08)

(56) References Cited

U.S. PATENT DOCUMENTS

| | | | | |
|---|---|---|---|---|
| 2022/0177303 A1* | 6/2022 | Thompson | ......... | G02B 27/0006 |
| 2022/0179127 A1* | 6/2022 | Aubry | ..................... | G02B 1/18 |
| 2022/0365249 A1* | 11/2022 | Kämpfe | ................ | G02B 5/208 |

OTHER PUBLICATIONS

Vorobyev, A. Y. et al.; "Multifunctional surfaces produced by femtosecond laser pulses," Journal of Applied Physics 117, 033103 (2015).

\* cited by examiner

200

205

210

LWIR Camera

300

305

315

1000

1005 — Create a set of nanostructures on a surface of an imaging device

1010 — Coat surface with an antireflective (AR) index-matching coating

1015 — Coat surface with the AR index-matching coating with a diamond like coating (DLC)

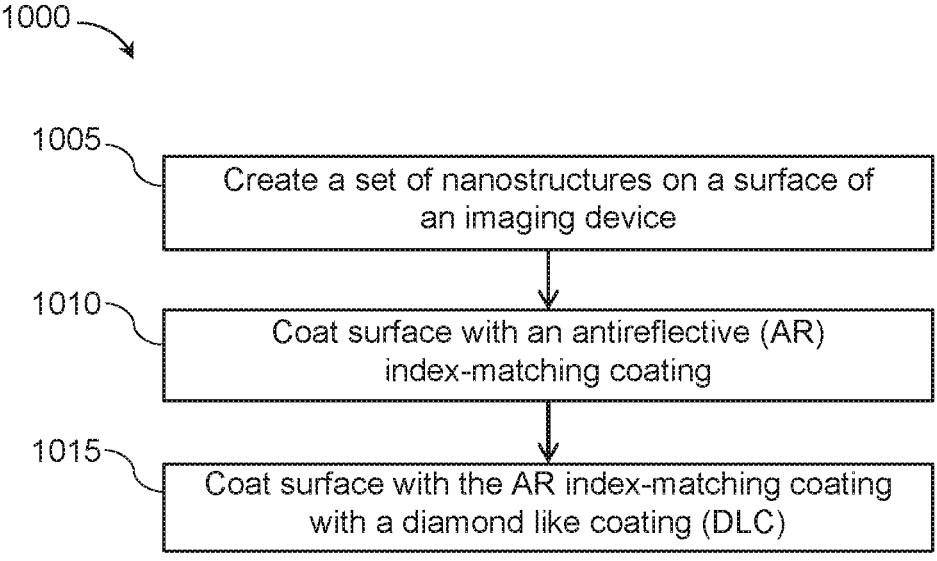

1105 — Coat surface with an antireflective (AR) index-matching coating

1110 — Coat surface with the AR index-matching coating with a diamond like coating (DLC)

1115 — Create a set of nanostructures in the DLC

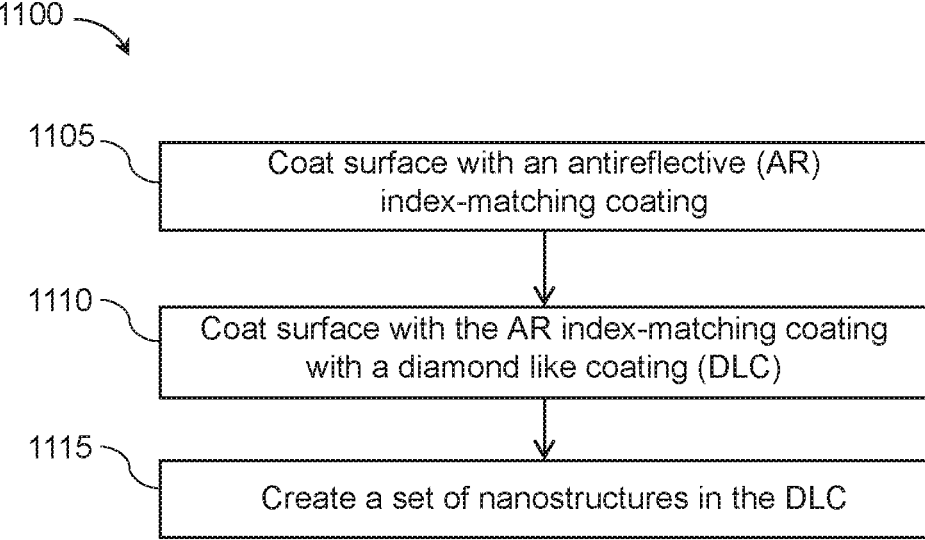

FIG. 11

SUPERHYDROPHOBIC SURFACE IN THERMAL INFRARED IMAGING DEVICE

CROSS REFERENCE TO RELATED APPLICATIONS

This application claims priority to and the benefit of U.S. Provisional Patent Application No. 63/232,591 filed Aug. 12, 2021 and entitled "SUPERHYDROPHOBIC SURFACE IN THERMAL INFRARED IMAGING DEVICE," which is incorporated herein by reference in its entirety.

TECHNICAL FIELD

The present invention relates generally to imaging and, more particularly, to superhydrophobic surface coating for surfaces of thermal infrared imaging devices.

BACKGROUND

Superhydrophobic surfaces are highly hydrophobic, i.e., extremely difficult to wet. For example, the contact angles of a water droplet on a superhydrophobic material in some cases may exceed 150°. This is also referred to as a lotus effect, after superhydrophobic leaves of the lotus plant. A droplet striking such surfaces may fully rebound like an elastic ball. Interactions of bouncing drops may be further reduced using special superhydrophobic surfaces that promote symmetry breaking, pancake bouncing, or waterbowl bouncing.

Accordingly, a superhydrophobic surface is a surface that repels water. A superhydrophobic coating is typically made from superhydrophobic materials. Water droplets hitting this kind of a superhydrophobic coating may fully rebound. Generally speaking, superhydrophobic coatings are made from composite materials where one component provides roughness and another component provides low surface energy.

While prior solutions addressing moisture accumulation on optical components of imaging devices have reduced moisture accumulation, such solutions have degraded a quality of images captured by the imaging devices. Thus, the need for modifying one or more components of imaging devices to prevent excessive accumulation of moisture onto a surface of an optical component of an imaging device.

SUMMARY

Various techniques are disclosed to prevent excessive accumulation of moisture onto components of an imaging device during moisture events, such as rain, snow, or the like, and thus, prevent imaging artifact degradation. For example, the various techniques may texturize one or more of the window, the lens element, the housing surrounding the window and lens element(s), or any combination thereof with nanostructures that result in a superhydrophobic property while keeping the surface resistant to abrasion thereby facilitating capture of a waveband encompassing at least a portion of the thermal infrared spectrum, such as a long-wave infrared spectrum.

In one embodiment, a method includes forming a plurality of nanostructures in the optical component, wherein the nanostructures exhibit a superhydrophobic property to prevent excessive moisture accumulation on the external surface of the optical component; depositing a diamond like coating (DLC) to provide an external surface of the optical component, wherein the DLC exhibits a resistance to abrasion; and providing a bulk layer of an optical component of a thermal imaging system, wherein the bulk layer is configured to pass thermal radiation.

In another embodiment, a thermal imaging system includes an optical component comprising: a bulk layer configured to pass thermal radiation; a diamond like coating (DLC) deposited to provide an external surface of the optical component, wherein the DLC exhibits a resistance to abrasion; and a plurality of nanostructures formed in the optical component, the plurality of nanostructures exhibiting a superhydrophobic property to prevent excessive moisture accumulation on the external surface of the optical component.

The scope of the present disclosure is defined by the claims, which are incorporated into this section by reference. A more complete understanding of embodiments of the present disclosure will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF THE DRAWINGS

FIGS. 10 to 11 illustrate flow diagrams of example processes for manufacturing an imaging device in accordance with one or more embodiments of the disclosure.

Figure 1:
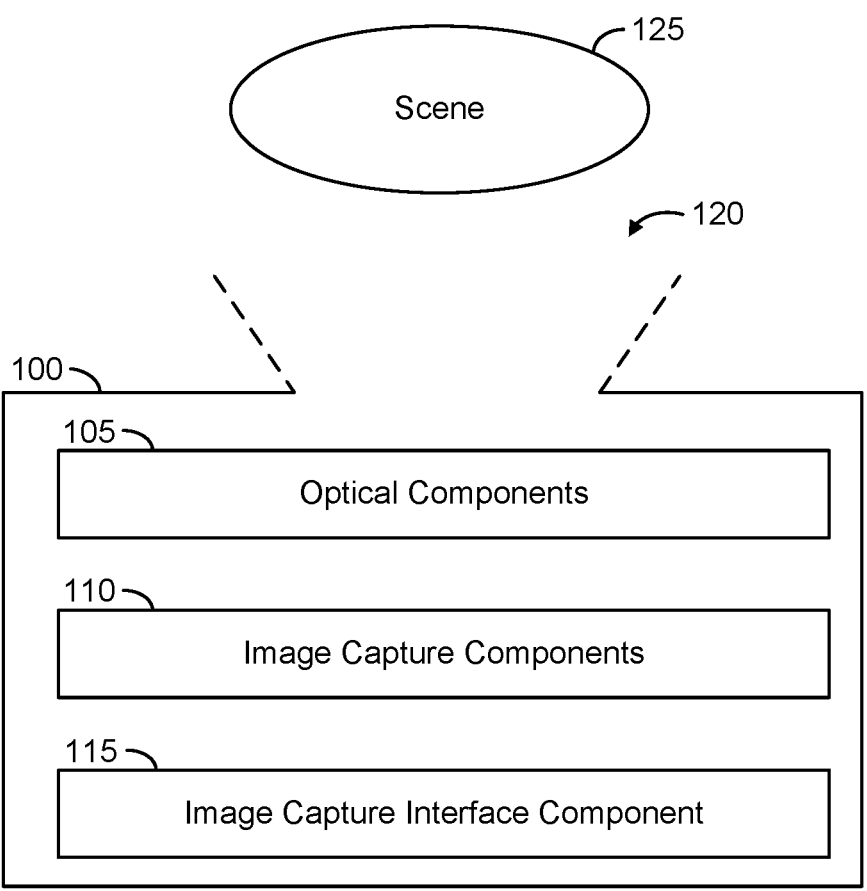
FIG. 1 illustrates a block diagram of an imaging device in accordance with one or more embodiments of the disclosure.

Embodiments of the present disclosure and their advantages are best understood by referring to the detailed description that follows. It is noted that sizes of various components and distances between these components are not drawn to scale in the figures. It should be appreciated that like reference numerals are used to identify like elements illustrated in one or more of the figures.

DETAILED DESCRIPTION

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and may be practiced using one or more embodiments. In one or more instances, structures and components are shown in block diagram form in order to avoid obscuring the concepts of the subject technology. One or more embodiments of the subject disclosure are illustrated by and/or described in connection with one or more figures and are set forth in the claims.

In one or more embodiments, optical systems and methods are provided. In some aspects, such systems and methods may be used for infrared imaging, such as thermal infrared imaging. Such imaging (e.g., infrared imaging) may be used for various applications, such as functional safety and vehicular (e.g., automotive) applications. In one embodiment, an imaging device includes a detector array and an optical element(s) to direct electromagnetic radiation associated with a scene to the detector array. By way of non-limiting examples, an optical element may include a window, a lens, a mirror, a beamsplitter, a beam coupler, and/or other component. In an aspect, the imaging device includes a window and a lens system including at least two lens elements. In some cases, the imaging device may also include other optical elements upstream of the window and/or the lens elements, downstream of the window and/or the lens elements, and/or interspersed between the window and the lens elements and/or between two lens elements.

The window may be placed in front of the lens system and thus closer to a scene than the lens system. In an aspect, a scene may be referred to as an object, a target scene, or a target object. The window may protect the lens system and/or other components (e.g., other components behind the window) of the imaging device from environmental damage, mechanical damage, and/or other damage, thus facilitating enhanced reliability of the imaging device. The window may transmit electromagnetic radiation for receipt by the lens system. The lens system may receive the electromagnetic radiation and direct the electromagnetic radiation to the detector array. In this regard, for a given lens element of the lens system, the lens element may receive electromagnetic radiation associated with a portion of the scene and may transmit the electromagnetic radiation. In a case the imaging device includes a series of lens elements, each lens element may receive and direct electromagnetic radiation to a next lens element of the series, with a last lens element receiving and directing electromagnetic radiation to the detector array. In some applications, at least one of the lens elements in the series refracts electromagnetic radiation.

The detector array may receive electromagnetic radiation directed (e.g., projected, transmitted) by the lens element(s) onto the detector array. In this regard, the electromagnetic radiation may be considered image data. The detector array may generate an image based on the electromagnetic radiation.

The window and the lens element(s) of the imaging device may be transmissive of electromagnetic radiation within a waveband dependent on a desired application. In an aspect, the imaging device may be a thermal infrared imaging device for facilitating capture of a waveband encompassing at least a portion of the thermal infrared spectrum, such as a mid-wave infrared spectrum and/or a long-wave infrared spectrum. In infrared imaging applications, the detector array may include an array of microbolometers and/or an array of other types of infrared detectors. As non-limiting examples, a window may include silicon and/or zinc blende (ZnS). As non-limiting examples, a lens element may include silicon, germanium, chalcogenide glass (e.g., $As_{40}Se_{60}$), germanium arsenide selenium (GeAsSe), $Ge_{22}As_{20}Se_{58}$, and/or $Ge_{33}As_{12}Se_5$. Window material and lens material used to manufacture the window and the lens element(s), respectively, are generally based on a desired application. For example, window material may be of sufficient hardness to protect components of the imaging device, such as the lens elements. For example, window material and lens material may be selected to allow a desired transmission waveband of the window and the lens elements.

In order to facilitate capture of a waveband encompassing at least a portion of the thermal infrared spectrum, such as a mid-wave infrared spectrum, a long-wave infrared spectrum, or the like (i.e., to prevent imaging artifacts degradation on signal to noise ratio due to contamination of front optical element, such as the aforementioned window), in various embodiments, one or more of a window, a lens element(s), a housing surrounding the window and lens element(s), or any combination thereof, are modified so as to exhibit a superhydrophobic property. Typically, the housing surrounding the window and lens element(s) is made of aluminum, although the illustrative embodiments recognize that other materials may be used for the housing. To prevent excessive accumulation of moisture onto a pupil of the thermal infrared imaging device during moisture events, such as rain, snow, or the like, and thus, prevent imaging artifact degradation, the various embodiments texturize one or more of the window, the lens element, the housing surrounding the window and lens element(s), or any combination thereof with nanostructures that result in a superhydrophobic property while keeping the surface resistant to abrasion thereby facilitating capture of a waveband encompassing at least a portion of the thermal infrared spectrum, such as a long-wave infrared spectrum.

According to some embodiments of the invention, a front surface of either the lens element or the window, if the window is present protecting the lens element and/or other components (e.g., other components behind the window) of the imaging device from environmental damage, is texturized to form a set (e.g., a plurality) of nanostructures on the lens element or the window. In accordance with this embodiment, as well as the additional embodiments disclosed hereafter, the nanostructures may be formed using one or more of a laser, etching, forging, stamping, or the like. Once texturized, the nanostructures on the lens element or the window may be coated with a thin, for example, 1 micrometer, diamond like coating (DLC) comprising carbon as a top layer. In accordance with this embodiment, as well as the additional embodiments hereafter, the DLC may be deposited using one or more different technologies such as, but not limited to, a Physical Vapor Deposition (PVD) cathodic arc process, PVD sputtering process, a Plasma-assisted Chemical Vapor Deposition (PACVD) process, or the like. The choice of technology and deposition parameters allow for a wide variety of performance characteristics, including hydrogenated and non-hydrogenated DLC coatings. Thus, the nanostructures formed on the lens element or the window result in a superhydrophobic property preventing excessive moisture accumulation while keeping a surface of the lens element or window resistant to abrasion and facilitate capture of a waveband encompassing at least a portion of the thermal infrared spectrum, such as a long-wave infrared spectrum.

According to additional embodiments of the invention, a front surface of either the lens element or the window, if the window is present protecting the lens element and/or other components (e.g., other components behind the window) of the imaging device from environmental damage, is coated with a thick, for example, 1.5 micrometers, diamond like coating (DLC) comprising carbon as a top layer (e.g., providing an external surface of the optical component). Then, the DLC is texturized to form a set of nanostructures on the DLC. Therefore, the nanostructures on the DLC result in a superhydrophobic property preventing excessive moisture accumulation while keeping a surface of the lens element or window resistant to abrasion and facilitate capture of a waveband encompassing at least a portion of the thermal infrared spectrum, such as a long-wave infrared spectrum.

According to additional embodiments of the invention, prior to depositing the DLC on the lens element or the window, an antireflective (AR) index-matching coating is deposited on the lens element or the window, to suppress broadband reflections. The AR index-matching coating may be made of, for example, Zinc Sulfide (ZnS), Yttrium Fluoride (YF3), Silicon Monoxide (SiO), Silicon-Germanium (SiGe), or the like. Thus, the AR index-matching coating is sandwiched between the DLC and lens element or the DLC and the window. Accordingly, the combination of the AR index-matching coating, the nanostructures, and the DLC, suppresses broadband reflections, results in a super-hydrophobic property preventing excessive moisture accumulation while keeping a surface of the lens element or window resistant to abrasion, and facilitates capture of a waveband encompassing at least a portion of the thermal infrared spectrum, such as a long-wave infrared spectrum.

According to additional embodiments of the invention, further nanostructures resulting in a superhydrophobic property may also be provided on the housing of an imaging device, such as a lens barrel, flange, or the like, surrounding the window and lens element. In various embodiments, such further nanostructures may be provided, for example, in addition to the various nanostructures associated with the lens element or the window as discussed herein. In this regard, it is beneficial for the housing, especially a flange of the housing surrounding a front optical surface, to exhibit the superhydrophobic property. During rain, this may prevent excessive accumulation of moisture onto the pupil of the imaging device.

FIG. 1 illustrates a block diagram of an imaging device 100 (e.g., an imaging system) in accordance with one or more embodiments of the disclosure. In an embodiment, the imaging device 100 may be an infrared imaging device. The imaging device 100 may be used to capture and process image frames. The imaging device 100 includes optical components 105, an image capture component 110 (e.g., an imager), and an image capture interface component 115.

The optical components 105 may receive electromagnetic radiation through an aperture 120 of the imaging device 100 and pass the electromagnetic radiation to the image capture component 110. For example, the optical components 105 may direct and/or focus electromagnetic radiation on the image capture component 110. The optical components 105 may include one or more windows, lenses, mirrors, beam-splitters, beam couplers, and/or other components. In an embodiment, the optical components 105 may include one or more chalcogenide lenses, such as lenses made of $As_{40}Se_{60}$, that allow for imaging in a wide infrared spectrum. Other materials, such as silicon, germanium, and GeAsSe, may be utilized. The optical components 105 may include components each formed of material and appropriately arranged according to desired transmission characteristics, such as desired transmission wavelengths and/or ray transfer matrix characteristics.

The image capture component 110 includes, in one embodiment, one or more sensors (e.g., visible-light sensor, infrared sensor, or other type of detector) for capturing image signals representative of an image of a scene 125. The image capture component 110 may capture (e.g., detect, sense) infrared radiation with wavelengths in the range from around 700 nm to around 1 mm, or portion thereof. For example, in some aspects, the image capture component 110 may include one or more sensors sensitive to (e.g., better detect) thermal infrared wavelengths, including mid-wave infrared (MWIR) radiation (e.g., EM radiation with wavelength of 2-7 μm) and/or long-wave infrared (LWIR) radiation (e.g., electromagnetic radiation with wavelength of 7-14 μm). In one embodiment, the sensor(s) of the image capture component 110 may represent (e.g., convert) or facilitate representation of a captured thermal image signal of the scene 125 as digital data (e.g., via an analog-to-digital converter).

The image capture interface component 115 may receive image data captured at the image capture component 110 and may communicate the captured image data to other components or devices, such as via wired and/or wireless communication. In various embodiments, the imaging device 100 may capture image frames, for example, of the scene 125.

In some embodiments, the optical components 105, image capture component 110, and image capture interface component 115 may be housed in a protective enclosure. In one case, the protective enclosure may include a lens barrel (e.g., also referred to as a lens housing) that houses the optical components 105 and a housing that houses the image capture component 110 and/or the image capture interface component 115. In this case, the lens barrel may be coupled to the housing. In an aspect, the protective enclosure may be represented by the solid-line box in FIG. 1 having the aperture 120. For example, the aperture 120 may be an opening defined in the protective enclosure that allows electromagnetic radiation to reach the optical components 105. In some cases, the aperture 120 may be an aperture stop of the imaging device 100.

The imaging device 100 may represent any type of camera system which, for example, detects electromagnetic radiation (e.g., thermal radiation) and provides representative data (e.g., one or more still image frames or video image frames). For example, the imaging device 100 may be configured to detect visible light and/or infrared radiation and provide associated image data. In some cases, the imaging device 100 may include other components, such as a shutter, a heater, a temperature sensor (e.g., for measuring an absolute temperature of a component of the imaging device 100), a filter, a polarizer, and/or other component. For example, a shutter between a window and a lens may be used to facilitate image capture and calibration. For example, an integrated heater may be coupled to the barrel of the imaging device 100.

Figure 2:
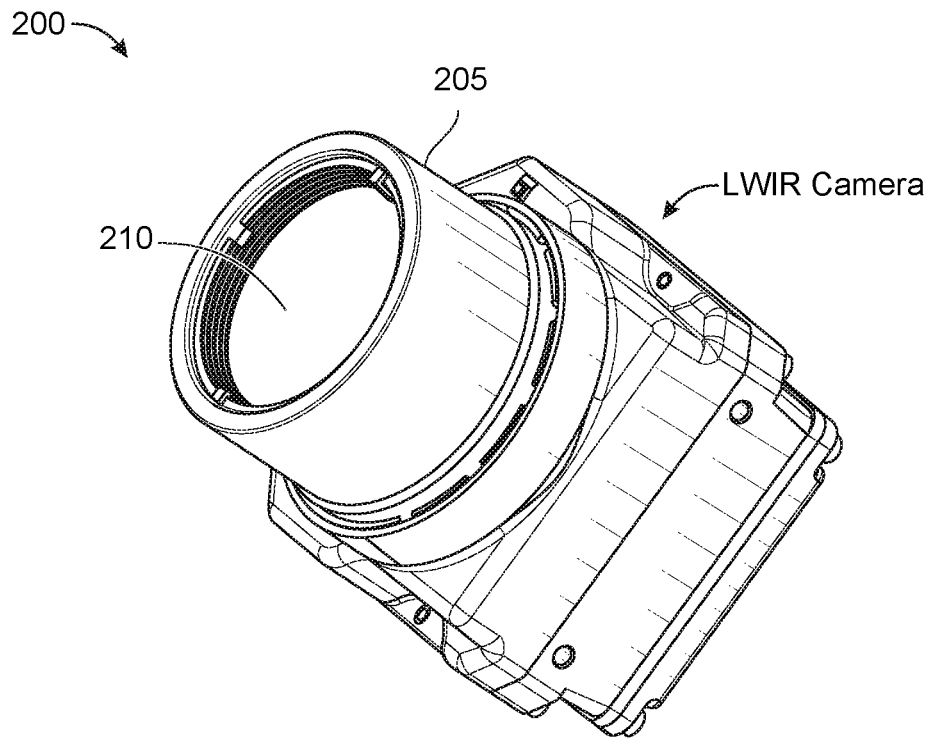
FIG. 2 illustrates one example of a long-wave infrared (LWIR) imaging device 200 in accordance with one or more embodiments of the disclosure.

Imaging device 100 may be implemented in accordance with various embodiments. FIG. 2 illustrates one example of a long-wave infrared (LWIR) imaging device 200 that may be used to implement imaging device 100 in accordance with one or more embodiments of the disclosure. LWIR imaging device 200 comprises lens barrel 205 which accommodates lens element 210 (e.g., corresponding to one or more optical components 105). In one embodiment, lens element 210 may be texturized to form a set of nanostructures. Thus, the set of nanostructures formed on lens element 210 results in a superhydrophobic property preventing excessive moisture accumulation while keeping the surface resistant to abrasion and facilitate capture of a waveband encompassing at least a portion of the thermal infrared spectrum, such as a long-wave infrared spectrum. The set of nanostructures on lens element 210 may then be thinly, for example, 1 micrometer, coated with a diamond like coating (DLC) comprising carbon as a top layer. In another embodiment, lens element 210 is thickly, for example, 1.5 micrometers, coated the DLC first and then nanostructures are formed on top of the DLC. Therefore, the nanostructures on the DLC result in a superhydrophobic property preventing excessive moisture accumulation while keeping a surface resistant to abrasion and facilitate capture of a waveband encompassing at least a portion of the thermal infrared spectrum, such as a long-wave infrared spectrum.

Figure 3:
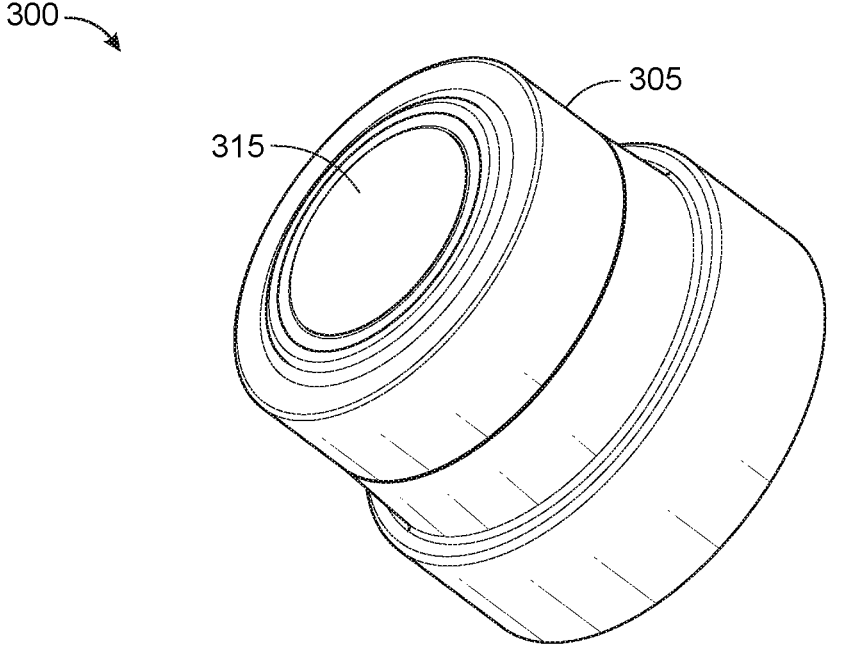
FIG. 3 illustrates an example of a lens barrel of a long-wave infrared (LWIR) imaging device 300 in accordance with one or more embodiments of the disclosure.

FIG. 3 illustrates an example of a lens barrel 305 of a long-wave infrared (LWIR) imaging device 300 that may be used to implement imaging device 100 in accordance with one or more embodiments of the disclosure. In this embodiment, lens barrel 305 accommodates a window 315 (e.g., corresponding to one or more optical components 105) that protects a lens element (e.g., also corresponding to one or more optical components 105), such as lens element 210 of FIG. 2. In one embodiment, window 315 may be texturized to form a set of nanostructures. The set of nanostructures formed on the window 315 results in a superhydrophobic property preventing excessive moisture accumulation while keeping a surface of the lens element or window resistant to abrasion and facilitate capture of a waveband encompassing at least a portion of the thermal infrared spectrum, such as a long-wave infrared spectrum. The set of nanostructures on window 315 may then be coated with a thin, for example, 1 micrometer, diamond like coating (DLC) comprising carbon as a top layer. In another embodiment, window 315 may be thickly coated with a thick, for example, 1.5 micrometers, DLC coating first and then nanostructures are formed on top of the DLC. Therefore, the nanostructures on the DLC result in superhydrophobic property preventing excessive moisture accumulation while keeping a surface of the lens element or window resistant to abrasion and facilitate capture of a waveband encompassing at least a portion of the thermal infrared spectrum, such as a long-wave infrared spectrum.

FIGS. 4 to 9 illustrate cross-sectional views of an optical component of an imaging device, such as one of the optical components 105 of imaging device 100, the lens element 210 of imaging device 100, and/or the window 315 of imaging device 200 in accordance with one or more embodiments of the disclosure. As further discussed herein, such optical components 105 may include one or more bulk layers, diamond like coating (DLC) layers, and/or antireflective (AR) index-matching coating layers.

Figure 4:
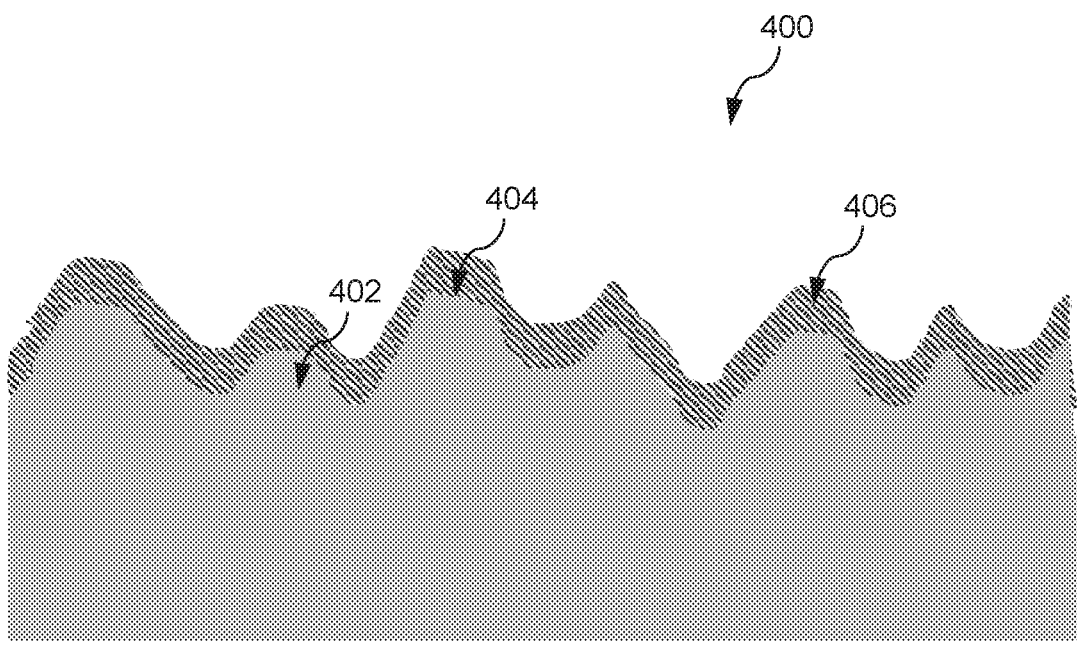
FIGS. 4 to 9 illustrate cross-sectional views of an optical component in accordance with one or more embodiments of the disclosure.

Referring now to FIG. 4, cross-sectional view 400 depicts a bulk layer (e.g., forming a portion of a lens element and/or a window configured to pass thermal wavelengths) 402 that is texturized to form a set of stochastic texture nanostructures 404. The set of stochastic texture nanostructures 404 may have a texture roughness (Ra) of less than 350 nanometers for long-wave infrared application, preferable a texture roughness of less than 150 nanometers for improved transmission, and more preferable less than 100 nanometers to minimize scattering. Then, the set of stochastic texture nanostructures 404 on bulk layer 402 may be coated with a thin, for example, 1 micrometer, DLC 406 comprising carbon as a top layer such that DLC 406 exhibits a contour corresponding to the stochastic texture nanostructures 404 formed on bulk layer 402. Thus, set of stochastic texture nanostructures 404 formed on bulk layer 402 result in superhydrophobic property preventing excessive moisture accumulation while keeping a surface of the bulk layer 402 resistant to abrasion and facilitate capture of a waveband encompassing at least a portion of the thermal infrared spectrum, such as a long-wave infrared spectrum.

Figure 5:
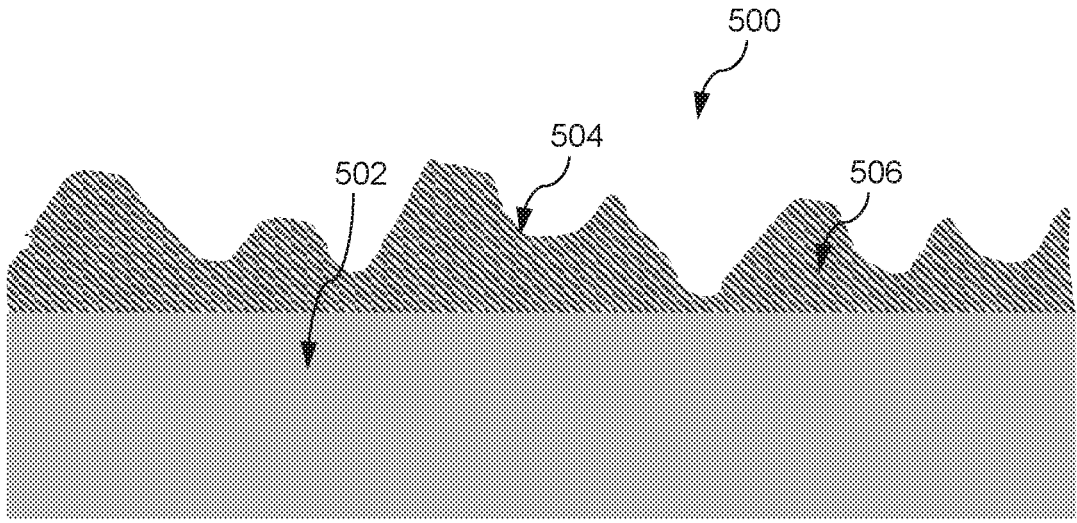

Referring now to FIG. 5, cross-sectional view 500 depicts bulk layer 502 coated with a thick, for example, 1.5 micrometers, diamond like coating (DLC) 506 comprising carbon as a top layer. Once DLC 506 is deposited, DLC 506 is texturized to form a set of stochastic texture nanostructures 504. The set of stochastic texture nanostructures may be formed using one or more of a laser, etching, forging, stamping, or the like, and have a texture roughness (Ra) of less than 350 nanometers for long-wave infrared application, preferable a texture roughness of less than 150 nanometers for improved transmission, and more preferable less than 100 nanometers to minimize scattering. Therefore, the set of stochastic texture nanostructures 504 formed in DLC 506 results in superhydrophobic property preventing excessive moisture accumulation while keeping a surface of the lens element or window resistant to abrasion and facilitate capture of a waveband encompassing at least a portion of the thermal infrared spectrum, such as a long-wave infrared spectrum.

Figure 6:
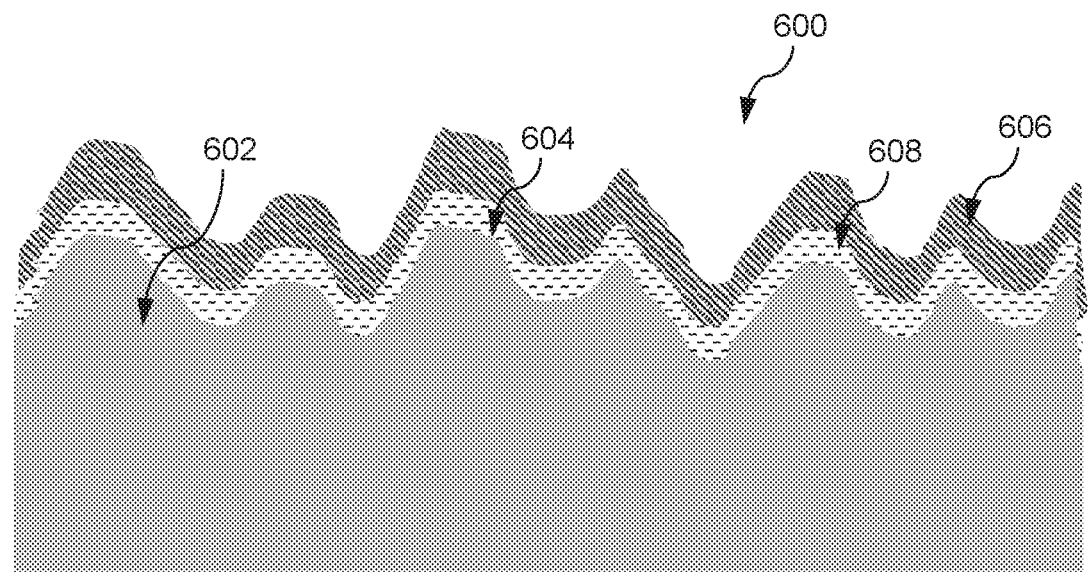

Referring now to FIG. 6, cross-sectional view 600 depicts bulk layer 602 that is texturized to form a set of stochastic texture nanostructures 604. The set of stochastic texture nanostructures 604 may have a texture roughness (Ra) of less than 350 nanometers for long-wave infrared application, preferable a texture roughness of less than 150 nanometers for improved transmission, and more preferable less than 100 nanometers to minimize scattering. In this illustration, an AR index-matching coating 608 is deposited on bulk layer 602, to suppress broadband reflections. Then, AR index-matching coating 608 may be thinly, for example, 1 micrometer, coated with DLC 606 comprising carbon as a top layer. Thus, the combination of the set of stochastic texture nanostructures 604, DLC 606, and AR index-matching coating 608, suppresses broadband reflections, results in superhydrophobic property preventing excessive moisture accumulation while keeping a surface of the lens element or window resistant to abrasion, and facilitates capture of a waveband encompassing at least a portion of the thermal infrared spectrum, such as a long-wave infrared spectrum.

Figure 7:
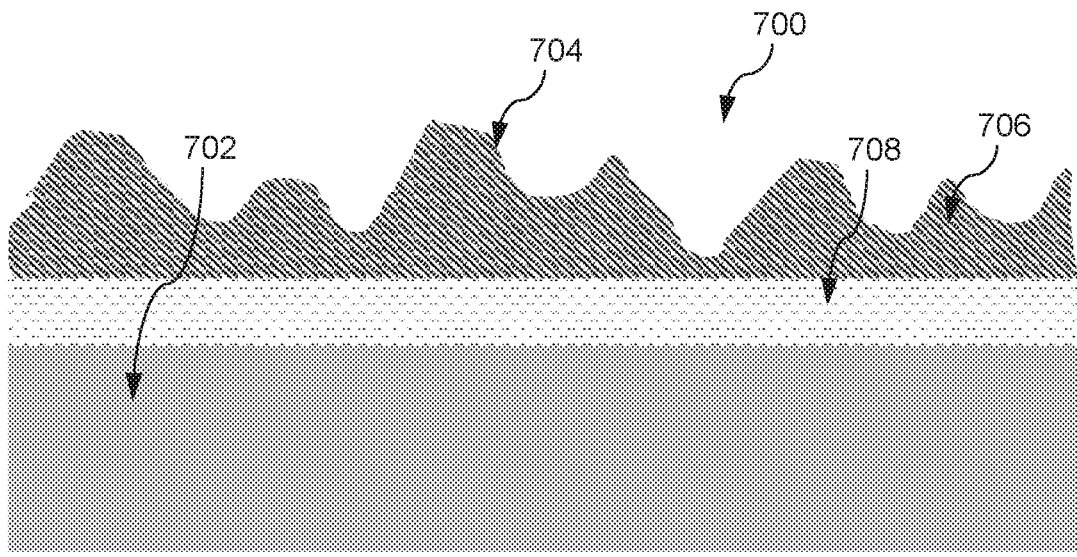

Referring now to FIG. 7, cross-sectional view 700 depicts an AR index-matching coating 708 deposited on bulk layer 702, to suppress broadband reflections. Then, AR index-matching coating 708 is thickly coated, for example, 1.5 micrometers, with DLC 706 comprising carbon as a top layer. Once DLC 706 is deposited, DLC 706 is texturized to form a set of stochastic texture nanostructures 704. The set of stochastic texture nanostructures may be formed using one or more of a laser, etching, forging, stamping, or the like, and have a texture roughness (Ra) of less than 350 nanometers for long-wave infrared application, preferable a texture roughness of less than 150 nanometers for improved transmission, and more preferable less than 100 nanometers to minimize scattering. Therefore, the combination of the set of stochastic texture nanostructures 704, DLC 706, and AR index-matching coating 708, suppresses broadband reflections, results in superhydrophobic property preventing excessive moisture accumulation while keeping a surface of the lens element or window resistant to abrasion, and facilitates capture of a waveband encompassing at least a portion of the thermal infrared spectrum, such as a long-wave infrared spectrum.

Figure 8:
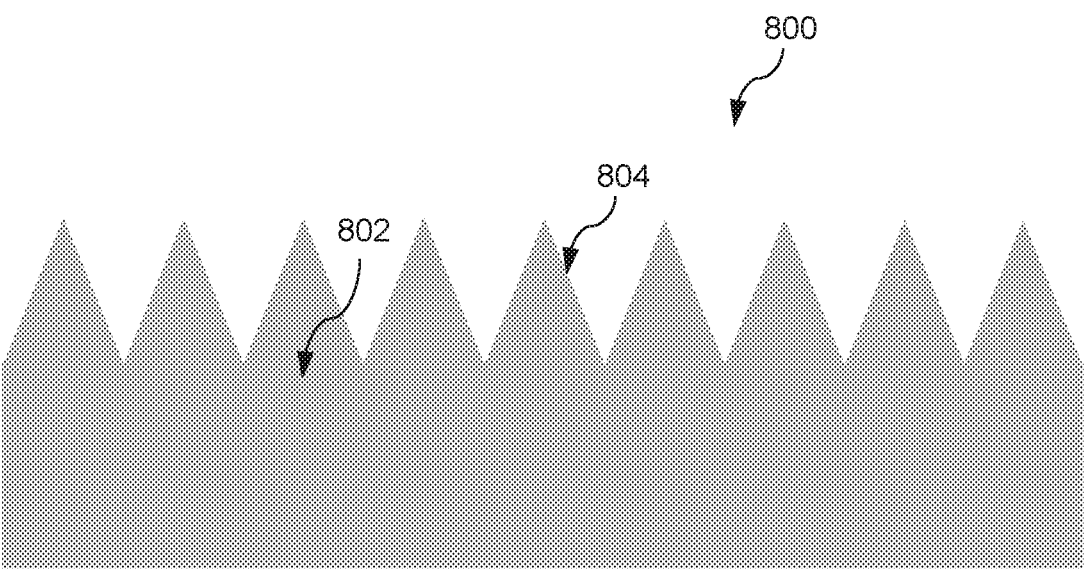

Referring now to FIG. 8, cross-sectional view 800 depicts bulk layer 802 that is texturized to form a set of structured texture nanostructures 804. The set of structured texture nanostructures 804 may have a peak-to-peak or valley-to-valley pitch between 1 and 10 micrometers, preferably 2-4 micrometers, to improve antireflective properties. The set of structured texture nanostructures 804 may also have a peak-to-valley height of 0.5 to 10 micrometers, preferably 1-5 micrometers, to improve antireflective properties. Thus, set of structured texture nanostructures 804 formed on bulk layer 802 result in superhydrophobic property preventing excessive moisture accumulation while improving antireflective properties in order to facilitate capture of a waveband encompassing at least a portion of the thermal infrared spectrum, such as a long-wave infrared spectrum.

Figure 9:
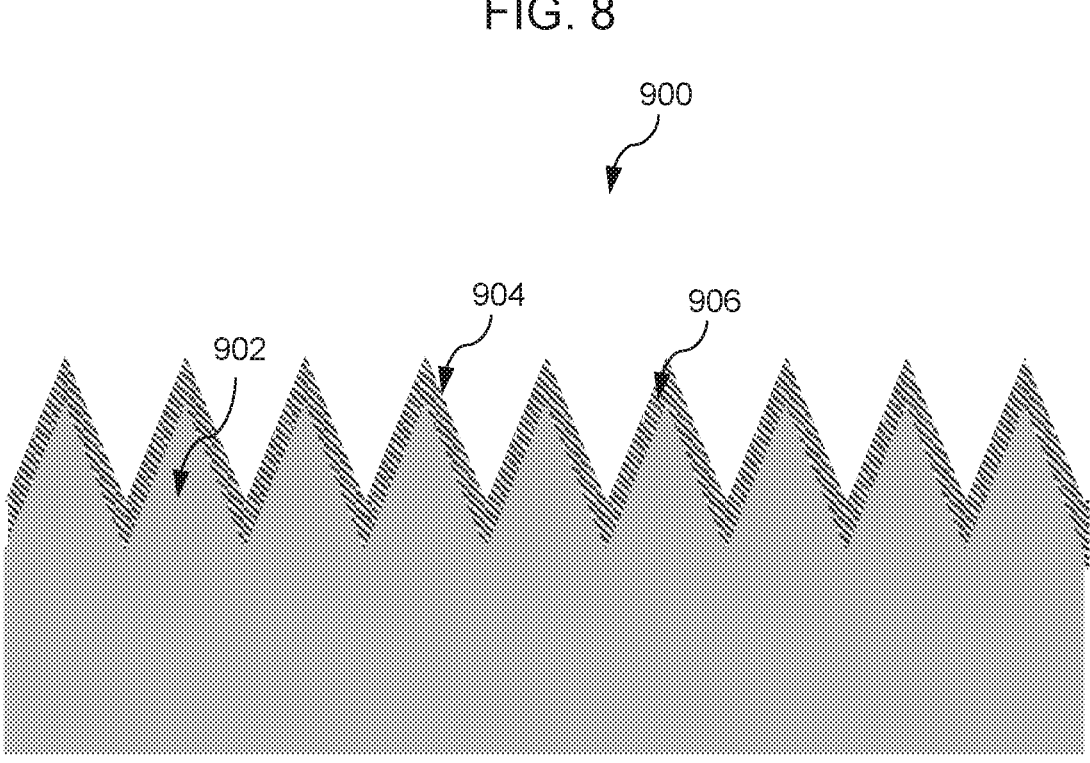

Referring now to FIG. 9, cross-sectional view 900 depicts bulk layer 902 that is texturized to form a set of structured texture nanostructures 904. The set of structured texture nanostructures 804 may have a peak-to-peak or valley-to-valley pitch between 1 and 10 micrometers, preferably 2-4 micrometers, to improve antireflective properties. The set of structured texture nanostructures 804 may also have a peak-to-valley height of 0.5 to 10 micrometers, preferably 1-5 micrometers, to improve antireflective properties. Then, the set of structured texture nanostructures 904 on bulk layer 902 may be coated with a thin, for example, 1 micrometer, DLC 906 comprising carbon as a top layer such that DLC 906 exhibits a contour corresponding to the structured texture nanostructures 904. Therefore, the set of structured texture nanostructures 904 formed on bulk layer 902 and the DLC 906 result in superhydrophobic property preventing excessive moisture accumulation while keeping a surface of the bulk layer 902 resistant to abrasion and improving antireflective properties in order to facilitate capture of a waveband encompassing at least a portion of the thermal infrared spectrum, such as a long-wave infrared spectrum.

FIG. 10 illustrates a flow diagram of an example process 1000 for manufacturing an imaging device in accordance with one or more embodiments of the disclosure. For explanatory purposes, the example process 1000 is primarily described herein with reference to components of FIGS. 1-9 and associated arrangement of these components. However, the example process 1000 is not limited to the components of FIGS. 1-9.

At block 1005, a set of nanostructures is formed on a surface of an imaging device (e.g., 100 of FIG. 1), the surface being either a lens element (e.g., 210 of FIG. 2) or a window (e.g., 315 of FIG. 3), if the window is present protecting the lens element and/or other components (e.g., other components behind the window) resulting in a superhydrophobic property preventing excessive moisture accumulation. At block 1010, the surface is then coated with an antireflective (AR) index-matching coating that suppresses reflections. At block 1015, the surface with the AR index-matching coating is then coated with a diamond like coating (DLC) comprising carbon as a top layer that provides abrasion resistance.

In accordance with one or more embodiments of the disclosure, the set of nanostructures may be formed using one or more of a laser, etching, forging, stamping, or the like, and the set of nanostructures may be a set of stochastic texture nanostructures, a set of structured texture nanostructures, or the like. The set of nanostructures result in a superhydrophobic property preventing excessive moisture accumulation on the surface. Additionally, the an antireflective (AR) index-matching coating at block 1010 is optional and the DLC) may be deposited directly onto the surface. As discussed previously, the DLC may be deposited using one or more different technologies such as, but not limited to, a Physical Vapor Deposition (PVD) cathodic arc process, PVD sputtering process, a Plasma-assisted Chemical Vapor Deposition (PACVD) process, or the like. The choice of technology and deposition parameters allow for a wide variety of performance characteristics, including hydrogenated and non-hydrogenated DLC coatings.

FIG. 11 illustrates a flow diagram of an example process 1100 for manufacturing an imaging device in accordance with one or more embodiments of the disclosure. For explanatory purposes, the example process 1100 is primarily described herein with reference to components of FIGS. 1-9 and associated arrangement of these components. However, the example process 1100 is not limited to the components of FIGS. 1-9.

At block 1105, a surface of an imaging device (e.g., 100 of FIG. 1), the surface being either a lens element (e.g., 210 of FIG. 2) or a window (e.g., 315 of FIG. 3), if the window is present protecting the lens element and/or other components (e.g., other components behind the window) is coated with an antireflective (AR) index-matching coating that suppresses reflections. At block 1110, the surface with the AR index-matching coating is then coated with a diamond like coating (DLC) comprising carbon as a top layer that provides abrasion resistance. At block 1115, a set of nanostructures is formed in the DLC resulting in a superhydrophobic property preventing excessive moisture accumulation.

It is noted that dimensional aspects provided above are examples and that other values for the dimensions can be utilized in accordance with one or more implementations. Furthermore, the dimensional aspects provided above are generally nominal values. As would be appreciated by a person skilled in the art, each dimensional aspect has a tolerance associated with the dimensional aspect. Similarly, aspects related to distances between features also have associated tolerances.

Where applicable, various embodiments provided by the present disclosure can be implemented using hardware, software, or combinations of hardware and software. Also, where applicable, the various hardware components and/or software components set forth herein can be combined into composite components comprising software, hardware, and/or both without departing from the spirit of the present disclosure. Where applicable, the various hardware components and/or software components set forth herein can be separated into sub-components comprising software, hardware, or both without departing from the spirit of the present disclosure. In addition, where applicable, it is contemplated that software components can be implemented as hardware components, and vice versa.

Software in accordance with the present disclosure, such as non-transitory instructions, program code, and/or data, can be stored on one or more non-transitory machine-readable mediums. It is also contemplated that software identified herein can be implemented using one or more general purpose or specific purpose computers and/or computer systems, networked and/or otherwise. Where applicable, the ordering of various steps described herein can be changed, combined into composite steps, and/or separated into sub-steps to provide features described herein.

The foregoing description is not intended to limit the present disclosure to the precise forms or particular fields of use disclosed. Embodiments described above illustrate but do not limit the invention. It is contemplated that various alternate embodiments and/or modifications to the present invention, whether explicitly described or implied herein, are possible in light of the disclosure. Accordingly, the scope of the invention is defined only by the following claims.

What is claimed is:

1. A method comprising:
   providing a bulk layer of an optical component of a thermal imaging system, wherein the bulk layer is configured to pass thermal radiation;

depositing a diamond like coating (DLC) to provide an external surface of the optical component;

forming a plurality of nanostructures within the DLC, wherein the nanostructures exhibit a superhydrophobic property to reduce moisture accumulation on the external surface of the optical component; and wherein the nanostructures are stochastic texture nanostructures that have a texture roughness (Ra) of less than 100 nanometers to improve transmission and reduce scattering of the thermal radiation.

2. The method of claim 1, further comprising:

prior to depositing the DLC, depositing an antireflective (AR) index-matching coating onto the bulk layer to reduce broadband reflections; and wherein the DLC is deposited onto the AR index-matching coating.

3. The method of claim 2, wherein the AR layer is a substantially planar surface.

4. The method of claim 1, further comprising forming an additional plurality of nanostructures on a housing of the thermal imaging system.

5. The method of claim 1, wherein the optical component is a lens element and/or a window.

6. The method of claim 1, wherein:

the forming is performed using a laser, etching, forging, and/or stamping; and the depositing is performed using a Physical Vapor Deposition (PVD) cathodic arc process, a PVD sputtering process, and/or a Plasma-assisted Chemical Vapor Deposition (PACVD) process.

7. The method of claim 1, wherein the nanostructures are structured texture nanostructures that have a peak-to-peak or valley-to-valley pitch of 2-4 micrometers and a peak-to-valley height of 1-5 micrometers to improve antireflective properties.

8. The method of claim 1, further comprising capturing a thermal image in response to the thermal radiation passed by the optical component.

9. The method of claim 1, wherein the nanostructures are formed exclusively within the DLC.

10. The method of claim 1, wherein the DLC comprises a continuous surface.

11. A thermal imaging system comprising:

an optical component comprising:

a bulk layer configured to pass thermal radiation;

a diamond like coating (DLC) deposited to provide an external surface of the optical component;

a plurality of nanostructures formed within the DLC, the plurality of nanostructures exhibiting a superhydrophobic property to reduce moisture accumulation on the external surface of the optical component; and wherein the nanostructures are stochastic texture nanostructures that have a texture roughness (Ra) of less than 100 nanometers to improve transmission and reduce scattering of the thermal radiation.

12. The system of claim 11, wherein:

the optical component further comprises an antireflective (AR) index-matching coating deposited on the bulk layer to reduce broadband reflections; and the DLC is deposited onto the AR index-matching coating.

13. The system of claim 12, wherein the AR layer is a substantially planar surface.

14. The system of claim 11, further comprising a housing comprising an additional plurality of nanostructures.

15. The system of claim 11, wherein the optical component is a lens element and/or a window.

16. The system of claim 11, wherein:

the nanostructures are formed using a laser, etching, forging, and/or stamping; and the DLC is deposited using a Physical Vapor Deposition (PVD) cathodic arc process, a PVD sputtering process, and/or a Plasma-assisted Chemical Vapor Deposition (PACVD) process.

17. The system of claim 11, wherein the nanostructures are structured texture nanostructures that have a peak-to-peak or valley-to-valley pitch of 2-4 micrometers and a peak-to-valley height of 1-5 micrometers to improve antireflective properties.

18. The system of claim 11, further comprising a thermal imager configured to capture a thermal image in response to the thermal radiation passed by the optical component.

19. The system of claim 11, wherein the nanostructures are formed exclusively within the DLC.

20. The system of claim 11, wherein the DLC comprises a continuous surface.

* * * * *